United States Patent [19]

Tanaka

[11] Patent Number: 5,799,479

[45] Date of Patent: Sep. 1, 1998

[54] WEAR-RESISTING LOW NOISE CHAIN

[75] Inventor: Koji Tanaka, Osaka, Japan

[73] Assignee: Tsubakimoto Chain Co., Osaka, Japan

[21] Appl. No.: 798,988

[22] Filed: Feb. 11, 1997

[30]   Foreign Application Priority Data

Feb. 13, 1996  [JP]  Japan .................. 8-025358

[51] Int. Cl.⁶ .............................. F16G 13/02; B21L 9/02
[52] U.S. Cl. ................................................ 59/4; 474/206
[58] Field of Search ......................... 59/4, 5; 474/206, 474/209

[56]   References Cited

U.S. PATENT DOCUMENTS

| | | |
|---|---|---|
| 3,359,815 | 12/1967 | Jeffrey et al. . |
| 4,642,078 | 2/1987 | Dupoyet ................. 474/206 |
| 5,073,153 | 12/1991 | Wu ......................... 474/206 |
| 5,098,349 | 3/1992 | Wu ......................... 474/206 |

FOREIGN PATENT DOCUMENTS

| | | | |
|---|---|---|---|
| 249272 | 12/1987 | European Pat. Off. ....... 59/4 |
| 2654171 | 5/1991 | France ...................... 474/206 |
| 58-17250 | 2/1983 | Japan . |
| 1-67357 | 4/1989 | Japan . |

*Primary Examiner*—David Jones
*Attorney, Agent, or Firm*—Armstrong, Westerman Hattori, McLeland & Naughton

[57]   ABSTRACT

A chain capable of diminishing noise and wear occurring at the time of engagement of the chain with a sprocket is provided. At least a portion of an inner surface of each inner plate, which comes into opposition to a side face of a tooth top of the sprocket at the time of engagement of the chain with the sprocket, is chamfered in a shape conforming to the contour of a side tooth form of the sprocket tooth top. Since a chamfered portion of an inner surface of each inner plate has a shape conforming to the contour of a side tooth form of a sprocket tooth top, the chamfered portion and the sprocket tooth top come into contact with each other smoothly in a state of face-to-face contact, so that the level of noise generated upon engagement of the chain with the sprocket can be reduced and it is possible to suppress the wear of the inner surface of the inner plate and that of the tooth top of the sprocket.

2 Claims, 3 Drawing Sheets

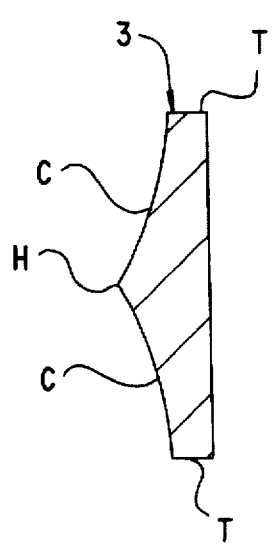
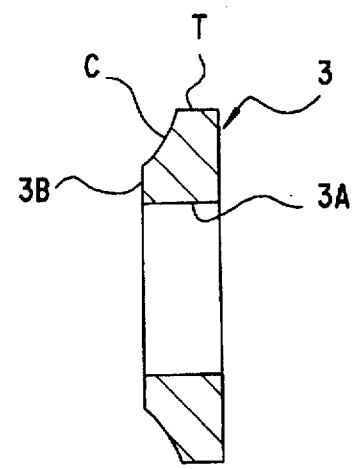
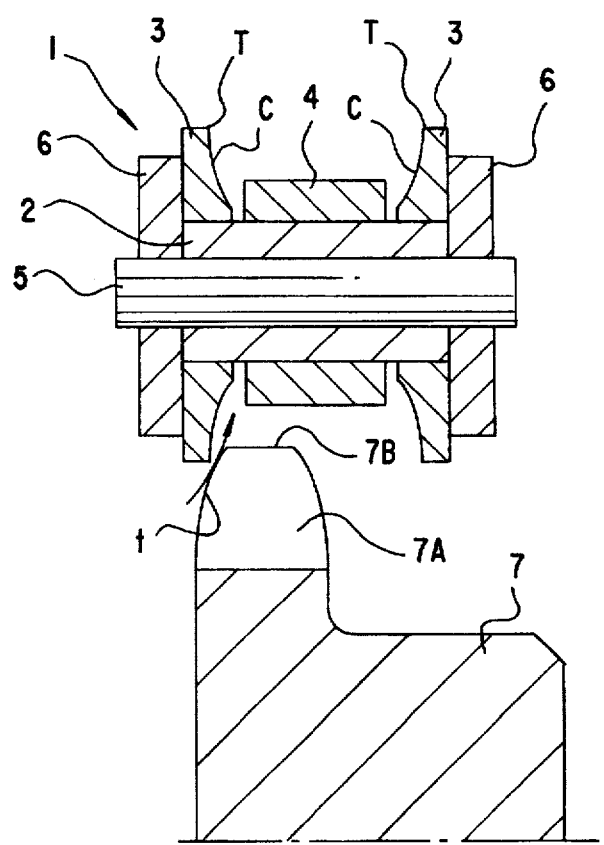

WEAR-RESISTING LOW NOISE CHAIN

FIELD OF THE INVENTION

The present invention generally relates to a chain for a power transmission and conveyance and more particularly, to a chain which is provided with inner plates, wherein each inner plate is improved to diminish noise and wear at the time of engagement of the inner plate with a sprocket.

BACKGROUND OF THE INVENTION

According to the construction of a conventional chain 11 for a power transmission and conveyance as shown in FIG. 6, a pair of inner plates 13 are fitted on both sides of a bushing 12, with a roller 14 being rotatably fitted on the outer peripheral surface of the bushing 12, and a pair of outer plates 16 are disposed on both outer sides, of the inner plates 13, respectively, and are fitted on both ends of a chain pin 15 extending through the interior of the bushing 12.

Even when the chain 11 of the above structure advances onto a sprocket 17 in a somewhat right- or leftward offset state relative to the sprocket, one inner plate 13 is guided along a curved side face of a tooth top 17A of the sprocket 17, whereby the position of the chain 11 is corrected to permit engagement of the roller 14 with the tooth top 17A of the sprocket 17.

However, in the case where the machining accuracy of an axial hole of the sprocket is low and hence the tooth top 17A deflects right and left (luring rotation of the sprocket 17, or where there is a deviation in the installed position of a rotating shaft of the sprocket 17 and the parallelism between the said rotating shaft and a rotating shaft of the other sprocket on which the chain 11 is entrained is poor, a central position of the tooth top 17A of the sprocket 17 deviates from a central position of an advancing path of the chain 11 when the chain advances onto the sprocket 17, and a top land 17B of the sprocket collides with an outer edge T' of one inner plate 13 in a narrow part of the width S, resulting in generation of a loud noise.

Further, after the above-described collision, the cuter edge T' of the inner plate 13, under the action of a tensile force on the chain 11, gougedly slips down onto the side face of the tooth top 17A from the top land 17B of the tooth top 17A of the sprocket 17, with the result that a worn portion F of such a shape as shown in FIG. 7 occurs in the inner surface of the inner plate 13, or the portion of the tooth top 17A of the sprocket 17 in abutment with the inner plate 13 undergoes wear.

However, although various methods have heretofore been proposed for diminishing the collision noise between the roller and the sprocket tooth face, no consideration has been given as to the noise generated upon collision of an inner plate with a tooth of a sprocket, nor has any measure been taken against wear caused by collision between the inner surface of an inner plate and the sprocket tooth top.

Accordingly, it is an object of the present invention to solve the above-mentioned problems of the prior art and provide a chain capable of suppressing noise and wear generated upon meshing of the chain with a sprocket.

SUMMARY OF THE INVENTION

According to the present invention, in order to achieve the above-mentioned object, there is provided a wear-resisting low noise chain in which at least a portion of the inner surface of each inner plate comes into opposition with a side face of a tooth top of a sprocket at the time of engagement of the chain with the sprocket. The inner surface of each inner plate is chamfered in a shape conforming to the contour of a side tooth form of the tooth top.

When the chain advances onto a sprocket and engages the sprocket in a right- or leftward offset state relative to a tooth top of the sprocket, the tooth top side face of the sprocket on the side closer to an inner plate comes into abutment with the chamfered portion of the inner plate. The chamfered portion is guided by the tooth top side face of the sprocket, whereby the offset of the chain is corrected and the tooth face of the sprocket and a roller of the chain are engaged with each other in an appropriate position.

At this time, since the chambered portion on the inner surface of the inner plate is formed in a shape conforming to the contour of a side tooth shape of the sprocket tooth top, the chamfered portion of the inner plate and the associated side face of the sprocket tooth top come into contact with each other obliquely without inducing any impact. Thus, the noise generated upon contact of the inner plate with the sprocket tooth top is diminished.

Further, since the side face of the sprocket tooth top and the chamfered portion of the inner plate contact each other in a state of face-to-face contact, a face pressure acting between the inner surface of the inner plate and the side face of the sprocket tooth top is small and hence the contact of the two brings about little wear.

BRIEF DESCRIPTION OF THE DRAWINGS

FIG. 3 is a sectional view taken on line III—III in FIG. 2;

FIG. 4 is a sectional view taken on line IV—IV in FIG. 2;

FIG. 5 is a sectional view showing an engaged state of the wear-resisting low noise chain with a sprocket of the present invention;

DETAILED DESCRIPTION OF THE INVENTION

Figure 1:
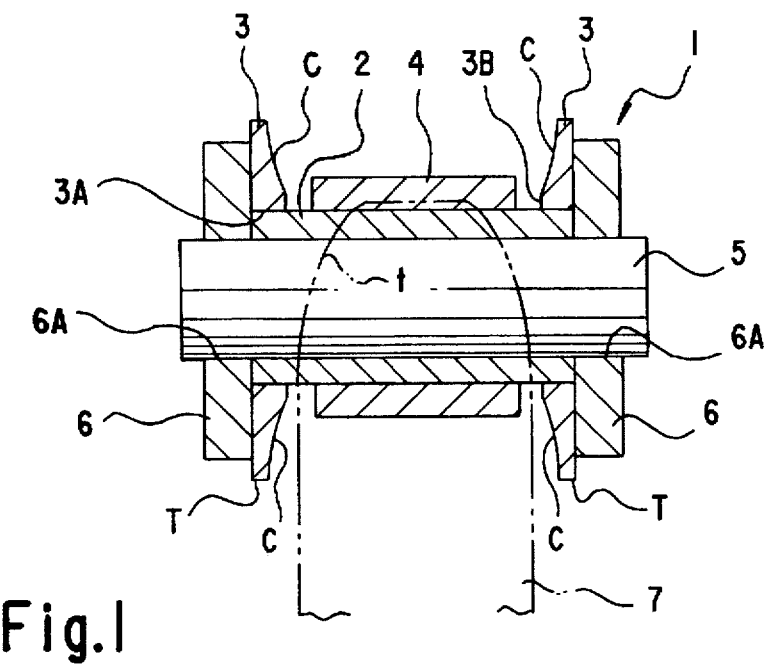
FIG. 1 is a sectional view of a wear-resisting low noise chain according to an embodiment of the present invention.

An embodiment of the present invention will be described hereinunder with reference to the accompanying drawings. FIG. 1 shows a wear-resisting low noise chain 1 (hereinafter referred to simply as the "chain") embodying the present invention, in which, as in the conventional above-described chain, an outer peripheral surface of a bushing 2 is press-fitted and fixed at both ends thereof into bushing holes 3A formed in a pair of inner plates 3, and between the paired inner plates 3 a roller 4 is loosely fitted on the outer peripheral surface of the bushing 2 rotatably. A chain pin 5 extends through the interior of the bushing 2 and is press-fitted and fixed into pin holes 6A of a pair of outer plates 6 which are disposed outside the paired inner plates 3.

A chamfered portion C is formed on the inner surface of each inner plate 3. When the chain 1 comes into mesh with a sprocket 7. The chamfered portion C is guided by a side face of a tooth top of the sprocket 7.

Figure 2:
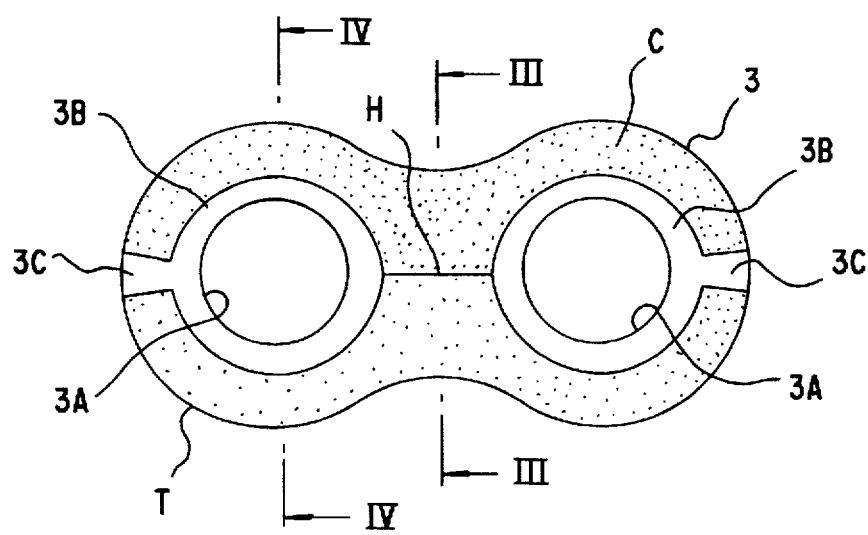
FIG. 2 is a side view of an inner surface side of an inner plate used in the wear-resisting low noise chain of the present invention.
Figure 6:
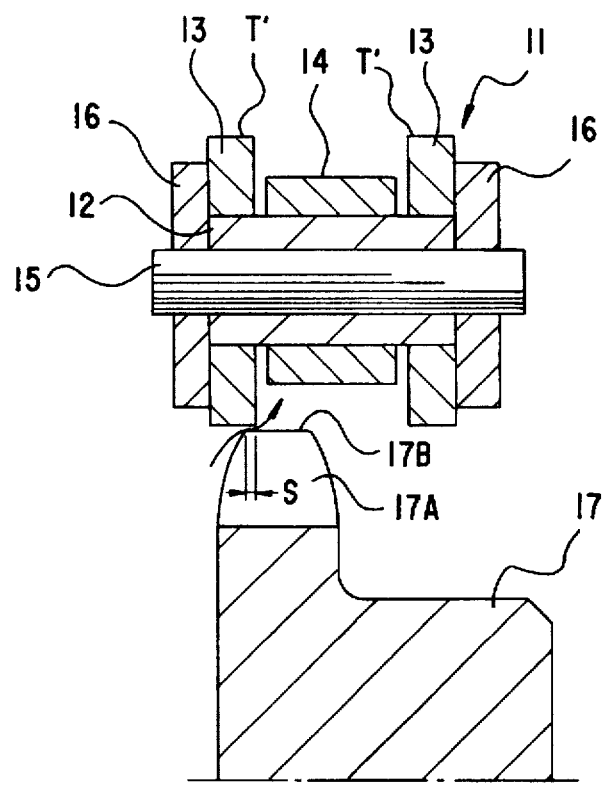
FIG. 6 is a sectional view showing an engaged state of a conventional chain with a sprocket.
Figure 7:
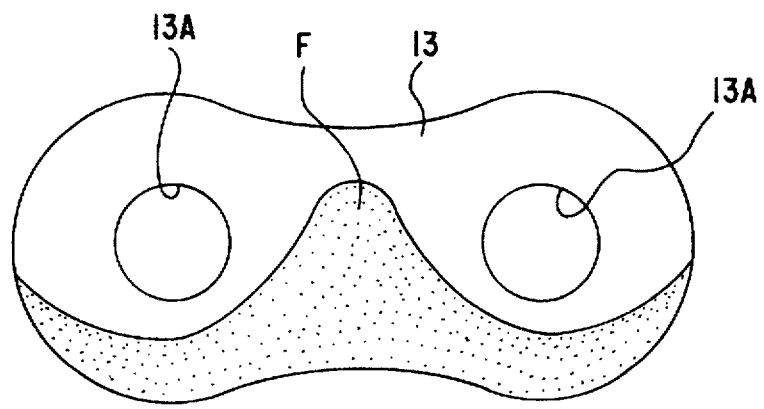
FIG. 7 is a diagram showing a worn condition of an inner surface of an inner plate used in the conventional chain.

FIG. 2 is a side view of the inner surface side of each inner plate 3. In this embodiment, as shown in the same figure, the chamfered portion C is formed on the inner surface of the inner plate except for flat peripheral edge portions 3B of two bashing holes 3A and also except for both side portions 3C extending from the flat peripheral edge portions 3B up to both longitudinal ends of the inner plate 3. The chamfered portion C is formed in such a manner that the thickness of the inner plate 3 becomes smaller from a central part H in the transverse direction of the inner surface of the inner plate 3 toward an outer edge portion T. The peripheral edges of the bushing holes 3A are reinforced by the flat peripheral edge portions 3B, whereby a sufficient fitting force for fixing the bushing 2 into each bushing hole 3A is ensured.

In the position indicated by line III—III in FIG. 2, as shown in the sectional view of FIG. 3, from the central part H in the transverse direction of the, inner surface of the inner plate 3 up to the outer edge portion T on both sides of the central part H, the chamfered portion C is formed in a shape conforming to the contour of a side tooth form t of the sprocket 7 indicated by a dashed-double dot line in FIG. 1. Also at the portion of the inner plate 3 which comes into opposition to the side face of the sprocket tooth top at the time of meshing of the chain 1 with the sprocket 7, the chamfered portion C is formed in the same sectional shape as in FIG. 3.

FIG. 4 shows a sectional shape of the inner plate in the position indicated by line IV—IV in FIG. 2 which position traverses the bushing hole 3A. In this position, the chamfered portion C is inclined while describing a gentle curve from a longitudinal center of the inner plate 3 toward the outer edge portion T on both sides. The chamfered portion C is formed so that the portion having a shape conforming to the contour of the side tooth form t of the sprocket 7 at line III—III position in FIG. 2 and the portion at IV—IV position in FIG. 2 are smoothly contiguous to each other.

FIG. 5 is a sectional view showing a state of engagement of the chain 1 having the above construction with the sprocket 7. In the same figure, one roller 4 of the chain 1 entrained on the sprocket 7 is about to mesh with a tooth top 7A of the sprocket. The chain 1 has advanced in a rightward offset state relative to the tooth top 7A of the sprocket 7 and the left-hand inner plate 3 assumes a position in which it interferes with the left-hand side of the sprocket tooth top 7A. When the left-hand inner plate 3 further approaches the tooth top 7A from the position, a top land 7B of the tooth top 7A gets in the right-hand side of the outer edge portion T of the inner plate 3 due to the presence of the chamfered portion C, and then the chamfered portion C abuts the left side face of the sprocket tooth top 7A.

Since the chamfered portion C of the left-hand inner plate 3 has a shape conforming to the contour of the side tooth form t of the sprocket 7, it comes into smooth contact with the left side face of the tooth top 7A and the position of the roller 4 is corrected for conformity with the sprocket tooth top 7A, so that the roller 4 is engaged with the sprocket tooth top 7A in a proper position.

Although in the above embodiment the chamfered portion is formed symmetrically on both sides in the longitudinal direction of the inner plate, it suffices for the chamfered portion to be formed on only the side where the chain is entrained on the sprocket.

According to the wear-resisting low noise chain of the present invention, as set forth hereinabove, since a chamfered portion of a shape conforming to the contour of a side face of a sprocket tooth top is formed on the inner surface of each inner plate of the chain, even if the sprocket tooth top is offset to one inner plate side at the time of engagement of the chain with the sprocket, the chamfered portion of the inner plate comes into abutment against the side face of the sprocket tooth top and is thereby guided smoothly to an appropriate position. Consequently, it is possible to avoid collision between a top land of the sprocket tooth top and an outer peripheral edge of the inner plate and hence possible to reduce the level of noise generated at the time of engagement of the chain with the sprocket.

Besides, since the side face of the sprocket tooth top and the chamfered portion are abutted against each other in a state of face-to-face contact, a face pressure acting between the inner surface of the inner plate and the side face of the sprocket tooth top is small. Consequently, the wear of the inner surface of the inner plate and that of the sprocket tooth top are suppressed and the durability of the chain can be improved.

What is claimed is:

1. A sprocket and chain assembly, comprising:

a sprocket having a tooth top decreasing in width in a radially outward direction at both side faces thereof; and an endless chain, engageable with said sprocket, including a pair of inner plates each having an inner surface, a bushing secured to said inner plates at both ends thereof, a pair of outer plates disposed outside said inner plates, and a chain pin extending through said bushing and being fixedly connected to said outer plate at both ends thereof, wherein said inner surface of said inner plate has a chamfered portion with a contour conforming to a contour of a side face of said tooth top of said sprocket.

2. The sprocket and chain assembly as recited in claim 1, wherein said inner surface of said inner plate further comprises a flat peripheral edge portion adjacent to said bushing, and wherein said chamfered portion is provided adjacent to said flat peripheral edge portion.

* * * * *